(12) United States Patent  (10) Patent No.: US 6,987,369 B1
Franks, II  (45) Date of Patent: Jan. 17, 2006

(54) MOTOR ASSEMBLY FOR PROVIDING AN ELECTRICALLY POWERED ENGINE

(76) Inventor: Rodney O. Franks, II, 17774 SE. Division St., Portland, OR (US) 97236

( * ) Notice: Subject to any disclaimer, the term of this patent is extended or adjusted under 35 U.S.C. 154(b) by 0 days.

(21) Appl. No.: 11/038,865

(22) Filed: Jan. 21, 2005

(51) Int. Cl.
*H02P 7/66* (2006.01)

(52) U.S. Cl. ............... 318/153; 180/65.3; 180/165.3; 701/69; 701/36; 322/14; 318/139; 318/152

(58) Field of Classification Search ............. 318/153, 318/139, 152; 322/14; 701/69, 36; 180/65.1, 180/65.3
See application file for complete search history.

(56) References Cited

U.S. PATENT DOCUMENTS

| | | | |
|---|---|---|---|
| D246,299 S | 11/1977 | Haggard | |
| 4,168,516 A * | 9/1979 | Lace | 361/241 |
| 4,254,843 A * | 3/1981 | Han et al. | 180/165 |
| 4,597,463 A | 7/1986 | Barnard | 180/165 |
| 4,951,769 A * | 8/1990 | Kawamura | 180/65.4 |
| 4,973,896 A * | 11/1990 | Shiga et al. | 322/28 |
| 5,212,431 A | 5/1993 | Origuchi et al. | 318/139 |
| 5,215,156 A | 6/1993 | Stulbach et al. | 180/65.3 |
| 5,588,498 A | 12/1996 | Kitada | 180/65.4 |
| 6,492,741 B1 * | 12/2002 | Morimoto et al. | 290/40 C |
| 6,546,320 B2 * | 4/2003 | Shimizu et al. | 701/22 |
| 2003/0132042 A1 * | 7/2003 | Beihoff et al. | 180/65.1 |
| 2003/0158638 A1 * | 8/2003 | Yakes et al. | 701/22 |
| 2005/0119806 A1 * | 6/2005 | Nasr et al. | 701/22 |

* cited by examiner

*Primary Examiner*—Rita Leykin

(57) ABSTRACT

A motor assembly includes a keyed on-off switch and at least one 12-volt battery coupled to the existing DC electrical system of the vehicle. A D.C. speed control unit regulates the current to a DC drive motor. A housing is positionable adjacent to a front or rear portion of the vehicle and includes a D.C. motor connected to the DC speed control unit and a 12-volt D.C. alternator. An A.C. generator is operably connected to at least one AC breaker box via the electrical system. A converter is electrically coupled to the existing electrical system and the A.C. breaker box. The system further includes a plurality of electrical outlets and a power switch operably connected thereto and to the A.C. breaker box wherein the outlets conveniently allow a user to supply power to an external device.

11 Claims, 3 Drawing Sheets

MOTOR ASSEMBLY FOR PROVIDING AN ELECTRICALLY POWERED ENGINE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a motor assembly and, more particularly, to an electrically motor powered generator assembly for providing an electrically powered motor.

2. Prior Art

Typical electric hybrid vehicles which are provided with a battery and a generator driven by an engine are well known in the prior art. However, in such a conventional electric hybrid vehicle, since the engine is intermittently operated at a rating rotating speed, a lot of exhaust gas is discharged before the catalyst of a catalytic converter becomes active in temperature. Thus, the conventional electric hybrid vehicle operates in a manner that degrades the advantage of an electric vehicle as being a low pollution vehicle.

An electric only vehicle is preferably used in view of air pollution, noise level and diversification of energy consumption. Such an electric vehicle is generally provided with a motor, a controller, and a battery instead of an engine, a transmission, and a fuel tank in the internal combustion engine. Typical batteries for electric vehicles include a secondary battery and fuel cells, which are chemical batteries.

Electric cars and trucks have been built and marketed by American automobile companies and function well. However, those vehicles depend solely on storage batteries which require charging electric power produced by electric power companies, many of which use relatively expensive crude oil to produce the electricity necessary to recharge the storage batteries. The same is true for trains and subway cars. There is a need for an improved electric vehicle which will be able to convert excess mechanical energy into electrical power to charge the vehicle's storage batteries.

Heretofore, electric vehicles, along with their benefits, have only been offered to the public by large corporation car companies, which require that the consumer purchase an expensive new car.

Accordingly, a need remains for a motor assembly providing an electrically powered motor in order to overcome the above-noted shortcomings. The present invention satisfies such a need by providing a motor assembly that is reliable, eliminates the need for fuel, and prevents emission of harmful pollutants. Such a motor assembly is quieter than conventional motors and can be easily installed by a person skilled in the art or by a professional mechanic.

BRIEF SUMMARY OF THE INVENTION

In view of the foregoing background, it is therefore an object of the present invention to provide an AC/DC electrical assembly for an electrically powered motor. These and other objects, features, and advantages of the invention are provided by a power assembly operably connectable to an AC generator and a 12-volt electrical system for powering a vehicle without the necessity of combustible fuel.

The motor assembly includes a keyed on-off switch for toggling the assembly between operating and non-operating modes and at least one 12-volt battery is electrically coupled to the existing electrical system of the vehicle and is controllable by the switch.

The assembly further includes a D.C. variable speed control unit for regulating DC drive motor speed, which runs the AC generator at 1,800 RPM. The assembly preferably further includes an AC generator connected to an AC breaker box and an AC accelerator/decelerator foot pedal which is connected to the AC interface drive unit. The AC interface drive unit is connected to the AC breaker box. The AC generator is connected to the AC breaker box and an AC shifter is connected to the AC interface drive unit. An AC heater with fan may be installed to defrost the windshield and to emit heat into the vehicle for comfort.

Such an AC heater is electrically coupled to the breaker box. A housing, preferably formed to be substantially water tight, is positionable adjacent to a front or rear portion of the vehicle and conveniently accessible via a hood or trunk floor of the vehicle. Such a housing includes a D.C. motor operable at 1,800 rpm and connected to the DC speed control unit, a DC battery pack, an AC generator, a DC alternator, an air conditioning compressor, power steering pump, hydraulic pump braking system, AC breaker box, circulating fan, and AC/DC converter. The AC generator provides electrical power for the AC vehicle drive motor, heater, AC/DC converter, AC breaker box with outlets wired to them, and the AC gear shifter interface, the AC accelerator/decelerator foot pedal, and the AC interface drive unit. The AC outlets conveniently allow a user to supply power to an external device.

The DC alternator electrical system is electrically coupled to a DC battery and vehicle DC electrical wiring harness. The DC battery system is electrically coupled to the DC drive motor. The AC/DC converter may be electrically coupled to the DC battery system or the DC drive motor system. The AC/DC converter is wired to the AC breaker box and converts AC electricity to DC current only. The cooling fan may be AC electric or DC electric or may be powered by mounting it to the shaft of the AC generator.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime and double prime numbers refer to like elements of the alternate embodiments.

Figure 1:
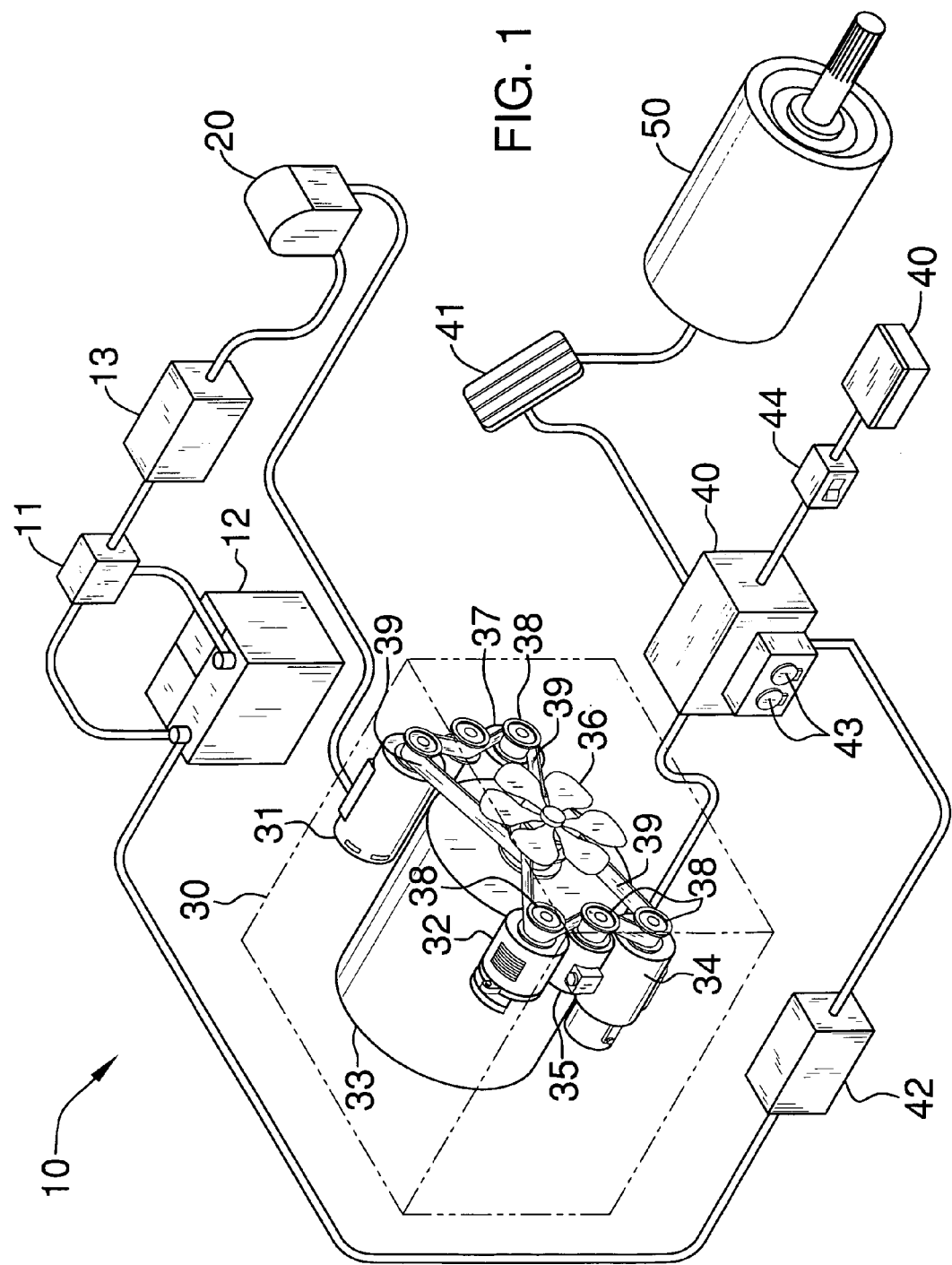
FIG. 1 is a perspective view showing an AC electric generator driven by a DC motor assembly which powers an AC electrically powered drive motor.
Figure 2:
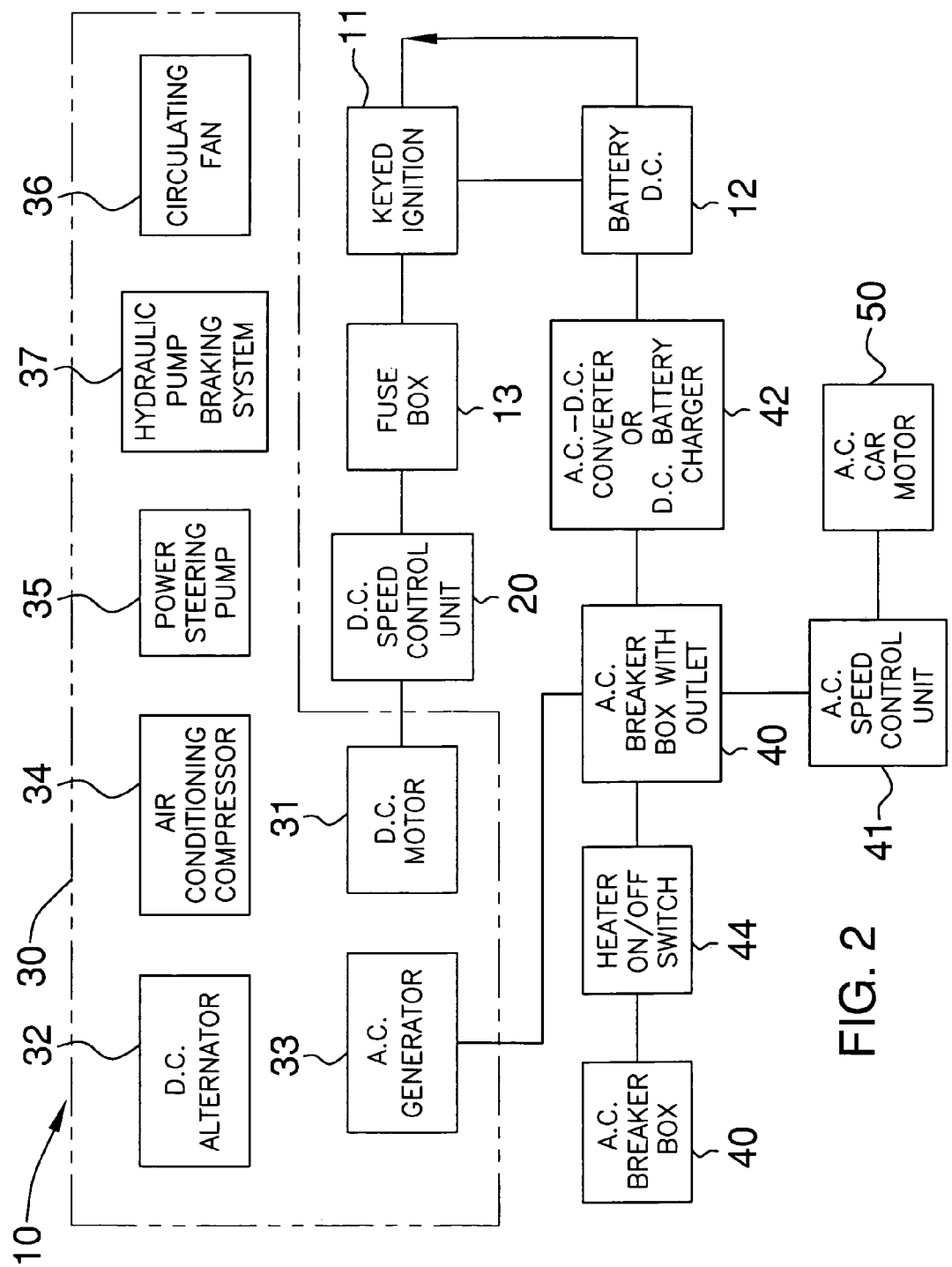
FIG. 2 is a schematic block diagram view of the assembly shown in FIG. 1.
Figure 3:
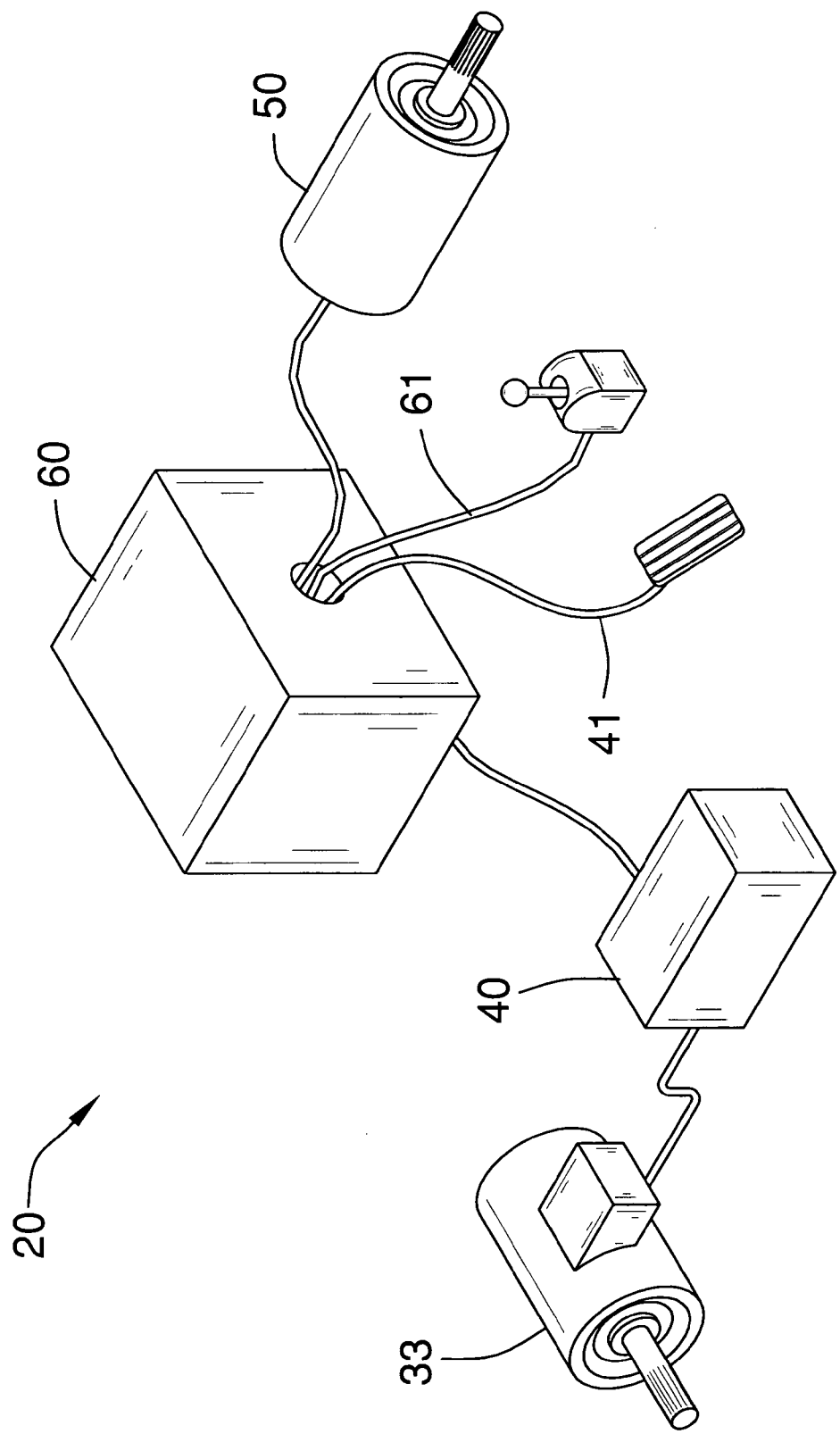
FIG. 3 is a schematic diagram showing the electrical relationship between an AC generator, an AC shifter, an AC accelerator/decelerator foot pedal, an AC interface drive unit, and an AC drive motor, speed control, AC vehicle motor, and an AC drive motor.

The assembly of this invention is referred to generally in FIGS. 1–3 by the reference numeral 10 and is intended to provide a power assembly for an electrically powered motor. It should be understood that the assembly 10 may be used to power many different objects including boats, planes, trains, homes, and portable generators and should not be limited to only small cars or vehicles.

Referring initially to FIG. 1, the assembly 10 includes an ignition switch 11 for toggling the assembly 10 between operating and non-operating modes. At least one 12-volt battery 12 is electrically coupled to the existing electrical system of the vehicle (not shown) and is controllable by the switch 11.

Referring to FIGS. 1 and 2, the assembly 10 further includes a D.C. speed control unit 20 for regulating a current by variable resistances and for defining a control unit 20 so that a user may control the speed of the AC generator at 1,800 RPM. A housing 30, formed to be substantially water-tight, is positionable adjacent a front or rear portion of the vehicle. Such a housing 30 includes a DC motor 31 operable at 1,800 RPM and connected to the DC speed control unit 20. A DC breaker box, DC alternator 32 and a DC battery pack 12 regulate the DC current flow through the vehicle, thereby providing current to the assembly 10. An AC generator 33 is electrically coupled to an AC breaker box 43 for supplying power to the AC heater (not shown), AC interface 60, AC/DC converter 42, AC speed control unit 41, AC drive motor 50, and the AC external outlets 43.

The AC/DC converter 42 may be electrically coupled to the AC breaker box 40 or plugged into the AC external outlet 43. The power supplied thereby may be used for supplying DC current to the DC motor 31 directly or through the DC battery system, if necessary. The AC and DC may be grounded to a vehicle frame via a ground plate (not shown). Such a ground plate is preferably formed from steel insulated by rubber. Because the DC motor 31 runs at twice the RPM of the AC generator 33, the speed control unit 20 decreases or increases the DC motor RPM via a governor (not shown). This advantageously reduces the DC motor 31 RPM by half to 1,800 RPM and increases the life of the motor 31.

Still referring to FIGS. 1 and 2, the housing 30 further includes an air conditioning compressor 34, a power steering pump 35, a fan 36, a hydraulic braking system 37, and a plurality of pulleys 38 secured to the compressor 34, the pump 35 and the fan 36 respectively. A serpentine belt 39 is positioned about the pulleys 38 for controlling a rotational speed of the fan 36 during operating conditions. Advantageously, if the above systems are too taxing for the 12 volt D.C. motor 31 then the use of a gear box (not shown) to increase power is another power option.

Referring to FIGS. 1–3, at least one AC breaker box 40 is electrically coupled to the AC interface drive unit 60 and the AC speed control unit 41, the heater toggle switch 44, the AC/DC converter 42, and the AC external outlets for advantageously allowing the user to control the vehicle acceleration. The AC heater with fan (not shown) may also be electrically coupled to the AC breaker box 40.

Referring to FIGS. 1 and 2, a converter 42 is electrically coupled to the existing electrical system and the AC breaker box 40 for converting alternating (AC) current to direct (DC) current. Such a converter 42 is connected in series to the DC battery pack 12 or DC motor 31. The DC speed control unit 20 is electrically coupled to the DC battery pack 12 via the DC breaker box 40.

Referring to FIG. 3, the AC generator 33 and the AC interface drive unit 60 are electrically coupled to the AC breaker box 40. The AC shifter 61 and AC speed control 41 are electrically coupled to the AC interface drive unit 60. The AC interface drive unit 60 is also electrically coupled to the AC vehicle drive motor 50.

It is appreciated by those of ordinary skill in the art that, in an alternate embodiment, a plurality of electric magnetic motors (not shown) may be electrically coupled to the AC car motor 50. One electric magnetic motor may be used for forward motion and another may be used for reverse motion. Such electric magnetic motors may be electrically coupled to the drive shifter and the drive shifter may be electrically coupled to the AC breaker box 40. The AC breaker box 40 may be electrically coupled to the AC generator 33. The AC interface drive unit 60 and the electric magnetic motors (not shown) may be electrically coupled as direct drives only.

In yet another embodiment, the speed control unit 41 may be electrically coupled to the AC car drive motor 50 for assisting in maintaining control of the AC car drive motor 50. In such an embodiment, a gear shift (not shown) may be connected to a transmission or gear box of a vehicle for selecting a forward or reverse drive direction. A standard vehicle transmission may be connected to the drive shaft of the AC car drive motor 50 for controlling forward and reverse motion.

In summary, the voltage of the D.C fork lift drive motor 31 is reduced by connecting the "S 1" and "A 1" poles together. The RPM are controlled by changing the brushes (not shown) in the motor 31 or by using a DC speed control unit. A portable starter drill (not shown) may also be used to start the D.C. motor 31 after the D.C. motor 31 has been modified, similar to remote controlled miniature gas cars and drag racing cars.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A power assembly operably connectable to an AC generator and a vehicle's DC electrical system for powering same, said power assembly comprising:
   an on-off keyed switch for toggling said assembly between operating and non-operating modes;
   an AC interface drive;
   an AC drive motor;
   an AC accelerator/decelerator pedal;
   an AC speed control for selectively accelerating and decelerating the vehicle during operating conditions, said AC speed control being electrically coupled to said AC interface drive;
   a DC speed control;
   a housing attachable to a selected portion of the vehicle and being accessible via a front hood or trunk floor of the vehicle, said housing including a DC motor operable at 1,800 RPM and being connected to said DC speed control for running the AC generator;
   at least one AC breaker box electrically coupled to said AC interface drive;
   a DC alternator for creating DC current throughout the DC electrical system, said DC alternator being disposed within said housing;
   an AC generator operably connected to said at least one AC breaker box and cooperating therewith for supplying alternating current, said AC generator being operable at a controlled speed of 1,800 RPM by said DC motor, said DC motor being operable at 1,800 RPM and controlled by the DC speed control unit; and
   a plurality of electrical outlets electrically coupled to a power switch and said AC breaker box wherein said outlets allow a user to supply power to an external device.

2. The power assembly of claim 1, wherein said AC interface drive is electrically coupled to said AC speed control unit and includes an AC electrical interface shifter for allowing a user to selectively propel the vehicle between alternate driving conditions.

3. The power assembly of claim 1, wherein said housing is formed to be substantially water-tight.

4. The power assembly of claim 1, wherein said AC interface drive is further electrically coupled to the AC drive motor, the AC breaker box, and the AC accelerator/decelerator pedal for allowing a user to control vehicle acceleration and deceleration.

5. A power assembly operably connectable to an AC generator and a vehicle's DC electrical system for powering same, said power assembly comprising:
   an on-off keyed switch for toggling said assembly between operating and non-operating modes;
   an AC interface drive;
   an AC drive motor;
   an AC accelerator/decelerator pedal;
   an AC speed control for selectively accelerating and decelerating the vehicle during operating conditions, said AC speed control being electrically coupled to said AC interface drive;
   a DC speed control;
   a housing attachable to a selected portion of the vehicle and being accessible via a front hood or trunk floor of the vehicle, said housing having a generally rectangular shape and including a DC motor operable at 1,800 RPM and being connected to said DC speed control for running the AC generator;
   at least one AC breaker box electrically coupled to said AC interface drive;
   a DC alternator for creating DC current throughout the DC electrical system, said DC alternator being disposed within said housing;
   an AC generator operably connected to said at least one AC breaker box and cooperating therewith for supplying alternating current, said AC generator being operable at a controlled speed of 1,800 RPM by said DC motor, said DC motor being operable at 1,800 RPM and controlled by the DC speed contol unit; and
   a plurality of electrical outlets electrically coupled to a power switch and said AC breaker box wherein said outlets allow a user to supply power to an external device.

6. The power assembly of claim 5, wherein said AC interface drive is electrically coupled to said AC speed control unit and includes an AC electrical interface shifter for allowing a user to selectively propel the vehicle between alternate driving conditions.

7. The power assembly of claim 5, wherein said housing is formed to be substantially water-tight.

8. The power assembly of claim 5, wherein said AC interface drive is further electrically coupled to the AC drive motor, the AC breaker box, and the AC accelerator/decelerator pedal for allowing a user to control vehicle acceleration and deceleration.

9. A power assembly operably connectable to an AC generator and a vehicle's DC electrical system for powering same, said power assembly comprising:
   an on-off keyed switch for toggling said assembly between operating and non-operating modes;
   an AC interface drive;
   an AC drive motor;
   an AC accelerator/decelerator pedal;
   an AC speed control for selectively accelerating and decelerating the vehicle during operating conditions, said AC speed control being electrically coupled to said AC interface drive;
   a DC speed control;
   a housing attachable to a selected portion of the vehicle and being accessible via a front hood or trunk floor of the vehicle, said housing having a generally rectangular shape formed to be substantially water-tight and including a DC motor operable at 1,800 RPM and being connected to said DC speed control for running the AC generator;
   at least one AC breaker box electrically coupled to said AC interface drive;
   a DC alternator for creating DC current throughout the DC electrical system, said DC alternator being disposed within said housing;
   an AC generator operably connected to said at least one AC breaker box and cooperating therewith for supplying alternating current, said AC generator being operable at a controlled speed of 1,800 RPM by said DC motor, said DC motor being operable at 1,800 RPM and controlled by the DC speed contol unit; and
   a plurality of electrical outlets electrically coupled to a power switch and said AC breaker box wherein said outlets allow a user to supply power to an external device.

10. The power assembly of claim 9, wherein said AC interface drive is electrically coupled to said AC speed control unit and includes an AC electrical interface shifter for allowing a user to selectively propel the vehicle between alternate driving conditions.

11. The power assembly of claim 9, wherein said AC interface drive is further electrically coupled to the AC drive motor, the AC breaker box, and the AC accelerator/decelerator pedal for allowing a user to control vehicle acceleration and deceleration.

* * * * *